(12) United States Patent
Sapp

(10) Patent No.: US 7,042,472 B2
(45) Date of Patent: May 9, 2006

(54) METHOD AND APPARATUS FOR MORPHING

(75) Inventor: Markus Sapp, Pinneberg (DE)

(73) Assignee: Apple Computer, Inc., Cupertino, CA (US)

( * ) Notice: Subject to any disclaimer, the term of this patent is extended or adjusted under 35 U.S.C. 154(b) by 44 days.

(21) Appl. No.: 10/758,476

(22) Filed: Jan. 14, 2004

(65) Prior Publication Data

US 2005/0151758 A1 Jul. 14, 2005

(51) Int. Cl.
*G09G 5/00* (2006.01)

(52) U.S. Cl. .................. 345/639; 345/619; 345/474

(58) Field of Classification Search ............... 345/639, 345/619, 640, 474, 646; 84/464 A, 464 R
See application file for complete search history.

(56) References Cited

U.S. PATENT DOCUMENTS

| | | | | |
|---|---|---|---|---|
| 5,933,150 A | * | 8/1999 | Ngo et al. .................. 345/473 |
| 6,028,608 A | * | 2/2000 | Jenkins ....................... 345/619 |
| 6,147,692 A | * | 11/2000 | Shaw et al. ................. 345/643 |
| 6,407,743 B1 | * | 6/2002 | Jones ......................... 345/582 |
| 6,570,078 B1 | * | 5/2003 | Ludwig ....................... 84/600 |

OTHER PUBLICATIONS

K. Fujimura, M. Makarov, Homotopic Shape Deformation, 1997, IEEE.*

* cited by examiner

*Primary Examiner*—Ricky Q. Ngo
*Assistant Examiner*—Jonathan Liou
(74) *Attorney, Agent, or Firm*—Blakely, Sokoloff, Taylor & Zafman LLP

(57) ABSTRACT

A method of morphing between the states of a sound, which is defined by a group of one or more parameters. The method comprises providing a display of at least five fixed points each associated with the group of one or more parameters. The values of each of the parameters in the group are predetermined for each fixed point and the value of at least one parameter for each fixed point is different from the value of the same parameter for all the other fixed points. The method further comprises positioning a unfixed point in the display to set the state of the sound, whereby the value of each of the parameters of the group defining the state is determined using the value of the corresponding parameter of each of the fixed points combined with a respective weighting factor. The respective weighting factor for each fixed point depends on the position of the unfixed point relative to that fixed point.

55 Claims, 10 Drawing Sheets

METHOD AND APPARATUS FOR MORPHING

BACKGROUND

The present invention relates to a method and apparatus for performing morphing. Primarily, the present invention is intended for morphing between different sounds. However, the present invention can be used for other types of morphing, such as morphing between images.

The term "morphing" is generally used to describe a smooth transition between multiple states of an "object", although it is usual to effect a transition between two states. For example, the first state of the object could be the image of a human head and the second state the image of a wolf's head.

In this example, the simplest transition possible would be to fade out one image while fading in the other image. This is known as cross-fading. However, this would be an implausible transition between the two displays for a viewer, who would not perceive that the human head is turning in to the wolf's head, and is not what is commonly meant by morphing.

Instead, what is commonly meant by morphing is the cross-fading of underlying properties of the object, not the result of those underlying properties. In the given example of morphing between a human head and a wolfs head, morphing involves establishing underlying properties of the image of the human head and corresponding underlying properties of the image of the wolf's head. These corresponding underlying properties are then cross-faded. For example, the positions, colours and shapes of corresponding portions of the respective images (such as the eyes, mouth and ears of the human and wolf's head respectively) would be determined and cross-faded smoothly. Thus, a viewer would see the eyes, mouth and ears of a human all separately changing into those of a wolf. This provides a much more plausible effect.

Similarly, morphing between two sounds does not mean cross-fading of the volume of two sounds, but rather continuously changing the underlying properties of the sound, such as timbre and pitch.

Music and other sound synthesisers are well-known. Commonly, synthesisers are computer-implemented, using either a standard personal computer (PC) with associated peripheral devices or a piano-style keyboard linked to a computer circuit. The synthesiser may also comprise a graphical user interface.

For example, a PC may have loaded thereon a music synthesiser application program, which has algorithms to implement, for example, different oscillators. Each oscillator may produce waveforms having different shapes and the frequency of each oscillator may be modified individually. The waveforms output by the oscillators may be mixed using a mixer—that is, added together or overlaid—to form a complex waveform, the relative strength or amplitude of the individual waveforms in the complex waveform also being controlled. Further shaping of the individual waveforms and of the complex waveform using one or more filters, such as a bandpass filter, can also be contemplated. Thus, a synthesiser may include oscillators (to generate repetitive waveforms), mixers (to combine waveforms), filters (to increase the strength of some overtones while reducing the strength of others) and amplifiers (to shape the contours of the waveforms). The output complex waveform can then be electrically sent to a speaker so that the user can listen to the created sound. In this way, a user is enabled to create a large number of distinct sounds. Of course, it should be recognised that different numbers of all these components and that other components can be used.

The settings used to create these distinct sounds can be saved and modified to create similar sounds having different tones, thereby forming a musical scale of a particular synthesised instrument. In addition, the timbre of the synthesised instruments can be controlled. The synthesiser program may also have algorithms representing a large number of pre-stored synthesised musical instruments, such as piano, drum kit, violin and so forth, so that the user does not have to individually create each distinct sound. Moreover, different tones output by different synthesised instruments for different amounts of time may be combined to create a medley of notes having various textures—in other words, music. In addition, a previously recorded sample of music may be mixed with the synthesised sounds. The sample might, for example, be a sung piece of music.

To facilitate musical control of the elements in the software-implemented synthesiser, the system 1 may comprise a GUI (Graphical User Interface) on a display screen controlled using a mouse and a standard PC keyboard. In addition, a piano-style keyboard may be used to "play" the synthesised instrument. Other controls, including wheels, sliders, switches and joysticks may also be provided, either together with or separate from the piano-style keyboard.

In addition to using simple oscillators to synthesise sounds, it is well known to model the oscillations of a vibrating string and to convert the results into sound using one or more simulated pickups. Thus, the vibration of each of the strings of a stringed instrument can be modelled by a sound synthesiser.

There are several possible approaches to modelling a vibrating string. One such approach is to describe the modelled string by means of a differential equation, which can then be solved numerically by means of a standard iterative method using a computer. Such an equation may taken into account variables such as what force is applied to the string at what time and what position, the mass per length of the string; the stiffness of the string; the tension of the string; losses associated with the stiffness of the string; losses associated with the tension of the string; and losses associated with the turbulent flow of the air surrounding the string.

Several methods for exciting such a simulated string and hence applying a force to the discrete elements are known. These include exciting the string in a percussive way, for example using a modelled piano hammer or a modelled plectrum to hit, pluck or otherwise strike the simulated string. Another way of exciting the string is to use a modelled bow, which mimics the action of a bow on a violin or cello.

Accordingly, synthesised sounds have a number of underlying parameters. These parameters can be readily controlled. For example, if a synthesiser simulates a string excited by a bow, the controllable set of parameters could include the positions of one or more simulated microphone pickups relative to the string, the string stiffness, losses affecting the string, bow position, bow pressure and bow speed. The same musical note can be played and the values of all these underlying parameters can be changed to effect morphing.

More specifically, a sound can be defined using a set of parameters. Values can be assigned to each of the parameters in the set in one arbitrary state and different values can be assigned to the same set of parameters in a second arbitrary state. If a single note is played, then the sound heard by the user will be different depending on whether the first state or the second state is selected. The sound can be morphed from the first state to the second state by cross-fading the values of the underlying parameters in the respective states. Accordingly, depending on the set of parameters chosen, it is for example possible to morph between one instrument, such as a piano, to another instrument, such as a saxophone, while playing a note or a tune.

Most morphing applications are performed in one dimension between two states. One example of this is morphing between a human head and a wolf's head, discussed above. Another example is morphing between two sounds using a specially provided modulation wheel on a synthesiser keyboard, for example as implemented in the Clavia Nordlead series. In this case, the state of the sound output by the synthesiser will depend on how far the wheel is rotated between the two endpoints, which respectively represent first and second states. Effectively, the state of the output sound is made up of a combination of the first state and the second state. The degrees to which the first and second states manifest themselves in the output sound depend on a weighting, which is determined by the rotation of the wheel.

Two dimensional morphing with more than two states is also known, for example in the VirSyn Cube synthesiser. An example of prior art two dimensional morphing will now be described with reference to FIG. 9, which shows a display 110. The display 110 represents four different states A, B, C and D as four points, the four points forming a square or rectangular two-dimensional pad 120. A cursor 130 is movable within the rectangular pad 120 to determine the weighting of each of the four states A, B, C and D in the output sound. If the cursor is positioned at one of the corners, the output sound takes only the state represented by that corner. If the cursor is positioned halfway between two points, the output sound takes a state in which the weighting of the two points is equal. If the cursor is positioned equidistantly from all four points, the output sound takes a state in which the weighting of each of the points is equal. Thus, morphing between four sounds is possible.

It is desired to effect morphing between more than four states. However, in prior art two dimensional morphing, there is no means by which a fifth point could be positioned without taking on a weighting of at least two of the other four states. Thus, there is no known method by which a fifth state can be added in the prior art.

SUMMARY

According to a first aspect of the present invention, there is provided a method of setting a state, which is defined by a group of one or more parameters, the method in one exemplary embodiment comprising:
providing a display of at least five fixed points each associated with the group of one or more parameters, wherein the values of each of the one or more parameters in the group are predetermined for each fixed point and wherein the value of at least one parameter for each fixed point is different from the value of the same parameter for all the other fixed points; and
positioning a unfixed point in the display to set the state, whereby the value of each of the one or more parameters of the group defining the state is determined using the value of the corresponding parameter of each of the fixed points combined with a respective weighting factor, the respective weighting factor for each fixed point depending on the position of the unfixed point relative to that fixed point.

According to a second aspect of the present invention, there is provided an apparatus for setting a state, which is defined by a group of one or more parameters, the apparatus in one exemplary embodiment comprising:
a display for displaying at least five fixed points each associated with the group of one or more parameters, wherein the values of each of the one or more parameters in the group are predetermined for each fixed point and wherein the value of at least one parameter for each fixed point is different from the value of the same parameter for all the other fixed points; and
a control for positioning a unfixed point in the display to set the state; and
a processor for determining the value of each of the one or more parameters of the group defining the state using the value of the corresponding parameter of each of the fixed points combined with a respective weighting factor, the respective weighting factor for each fixed point depending on the position of the unfixed point relative to that fixed point.

BRIEF DESCRIPTION OF THE DRAWINGS

Embodiments of the present invention will now be described by way of further example only and with reference to the accompanying drawings, in which.

DETAILED DESCRIPTION

Figure 9:
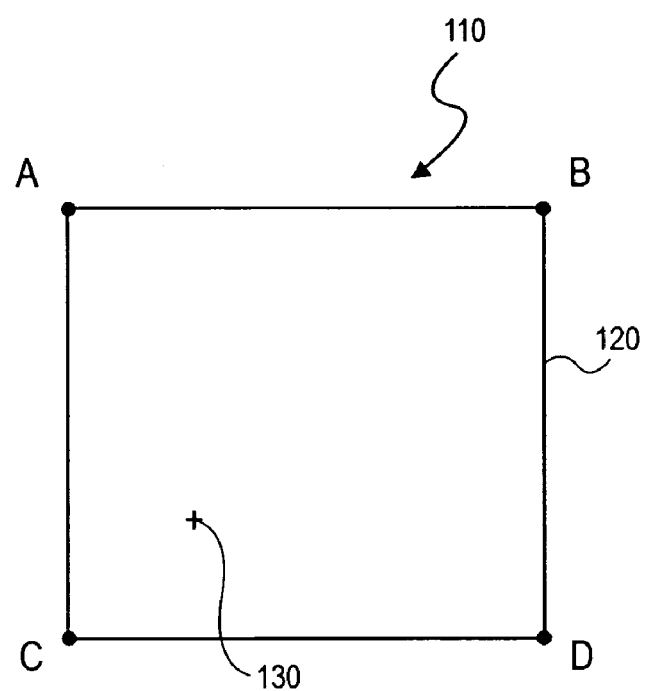
FIG. 9 shows a prior art morph pad.

The inventor has recognised that a problem with prior art four point morph pads, such as that shown in FIG. 9 is that there is no natural neutral position for states A–D. In other words, there is no place on the pad in which the weighting for all four states A–D is zero. Thus, no pure fifth state can be obtained using prior art morph pads. Accordingly, the present invention comprises, in one exemplary embodiment, providing a neutral position in a two dimensional morph pad, at which the weighting of four states is zero and the weighting of a fifth state is 1. In other words, at the neutral position the output sound takes only the fifth state and none of the other four states.

Figure 1:
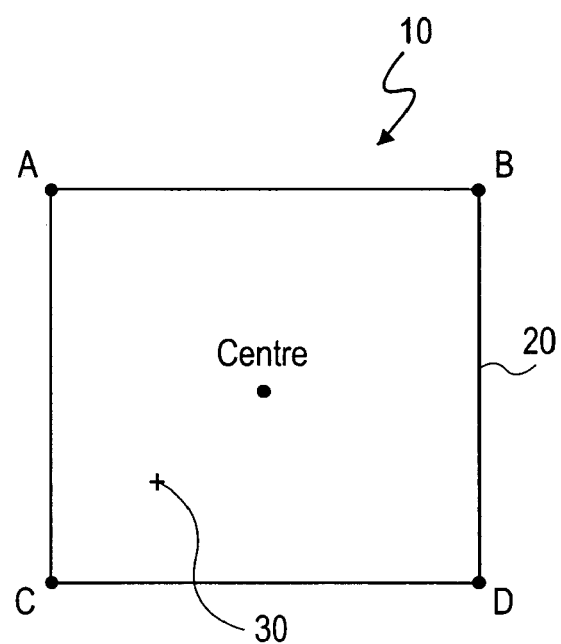
FIG. 1 shows a morph pad display according to the present invention.

FIG. 1 shows a morph pad display 10 according to a preferred example of the present invention. As with the prior art morph pad shown in FIG. 9, the morph pad 20 of the present invention comprises four corner points A, B, C and D, each representing a predetermined state. In addition, the morph pad 20 comprises a centre point, labelled Centre, which represents a fifth predetermined state. Each point or state is associated with the same group of parameters. The number of parameters in the group need only be limited by the processing power available and the requirements of the user. However, the values of the parameters for one point can be different to the values of the (same) parameters for other points. The minimum requirement is that the value of at least one parameter for each fixed point is different from the value of the same parameter for all the other fixed points. If this were not the case, then all the parameter values for two or more points would be the same. These points would therefore define the same state.

In addition, the display 10 comprises a cursor 30, acting as a sixth point, which is provided in and is movable over the pad 20. The state of the output sound can be set by positioning the cursor in the morph pad. Thus, morphing between the five points can be achieved by moving the cursor in the pad.

Figure 2:
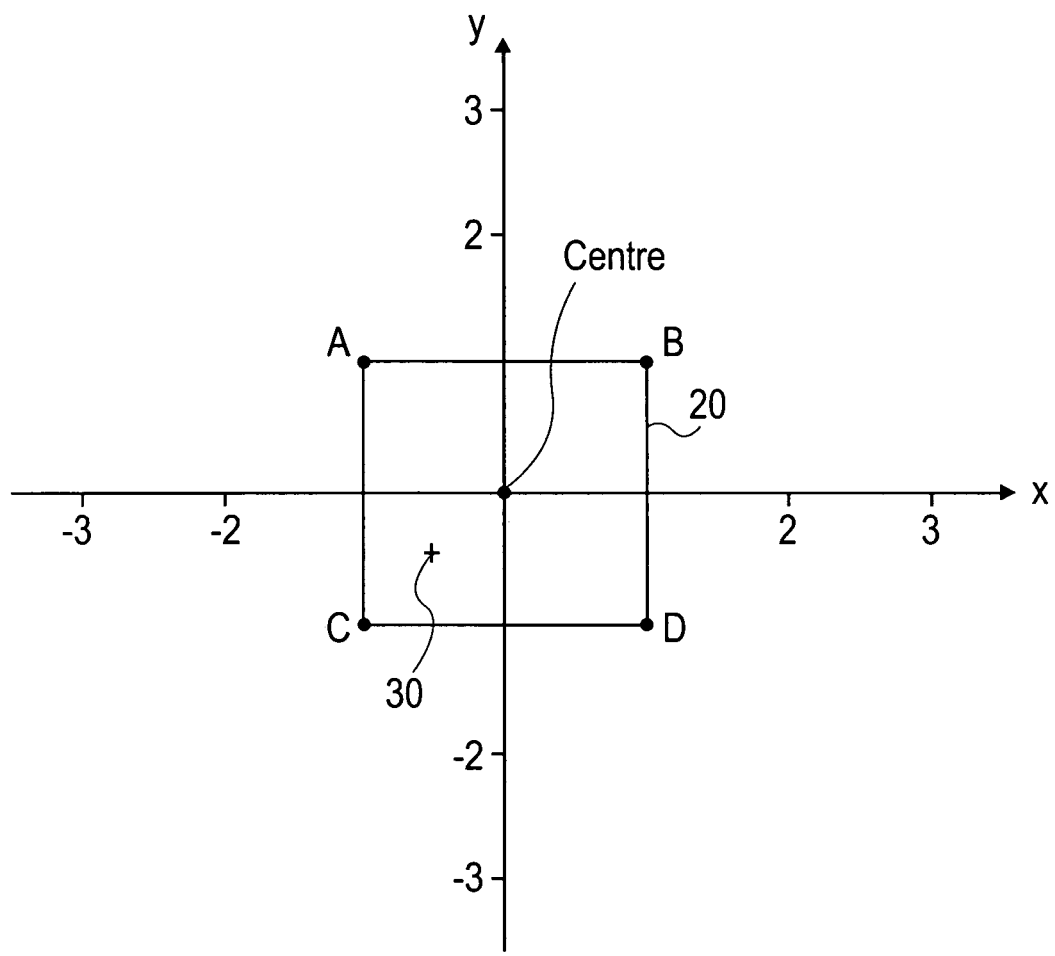
FIG. 2 shows the morph pad of FIG. 1 represented using an arbitrary coordinate system.

FIG. 2 shows the morph pad 20 of FIG. 1 using an arbitrary coordinate system. As shown in FIG. 2, the morph pad 20 is a square with its centre at the origin [0, 0]. Thus, the fifth point (Centre) is positioned at the origin. The remaining points A–D are positioned at [−1,1], [1,1], [−1,−1] and [1,−1] respectively. Accordingly, each of points A–D is a distance of sqrt 2 from the centre point.

The expected smooth morphing behaviour between the points is ensured by defining an appropriate weighting function $Wn[x, y]$ for each of the five points. In particular, the weighting functions relate the weighting of the respective points A, B, C, D and Centre in the final output state to the $[x, y]$ position of the cursor in the morph pad.

Preferably, the weighting functions follow the rules that:
when the cursor is positioned on one of the points A, B, C, D and Centre, the weighting factor for that point must be 1 and the weighting factor of the other four points must be set at 0;
when a parameter has the same value for two neighbouring points (for example A and B, or D and Centre; but not A and D, which are not neighbouring), the morphed value of the parameter must remain constant as the cursor is moved along a straight line between the neighbouring points (for example from A to B or from D to Centre); and
when a parameter has the same value for all five points, the morphed value of the parameter must remain constant for all positions of the cursor in the morph pad (the square defined by points A–D).

Preferably, the sum of the respective weighting factors of the five points must always equal 1, wherever in the square the cursor is positioned. In a preferred embodiment of the present invention, the weighting functions are square-based, right pyramid-shaped weighting functions. That is, the weighting function for each point or state can be envisaged as a pyramid having a square base and its axis perpendicular to the base—in other words, the apex of the pyramid is over the centre of the square base. At the base, the weighting function for the respective point is 0. At the apex, the weighting function for the respective point is 1. Between the base and the apex, the weighing function for the respective point depends on the altitude of the point above the base. This altitude is dependent on how the pyramid surfaces slope.

As the cursor 30 is moved in the square morph pad 20, the position of the cursor over each of the weighting pyramids for the respective points will change. The weighting factor for each point in the final output is determined according to the height of the cursor up a slope of the respective pyramid for that point. Once the weighting factors have been established, the value of each of the parameters of the point defined by the cursor is determined by adding together the results of the respective values of the corresponding parameter of the five points each multiplied by the respective weighting factor.

Figure 3:
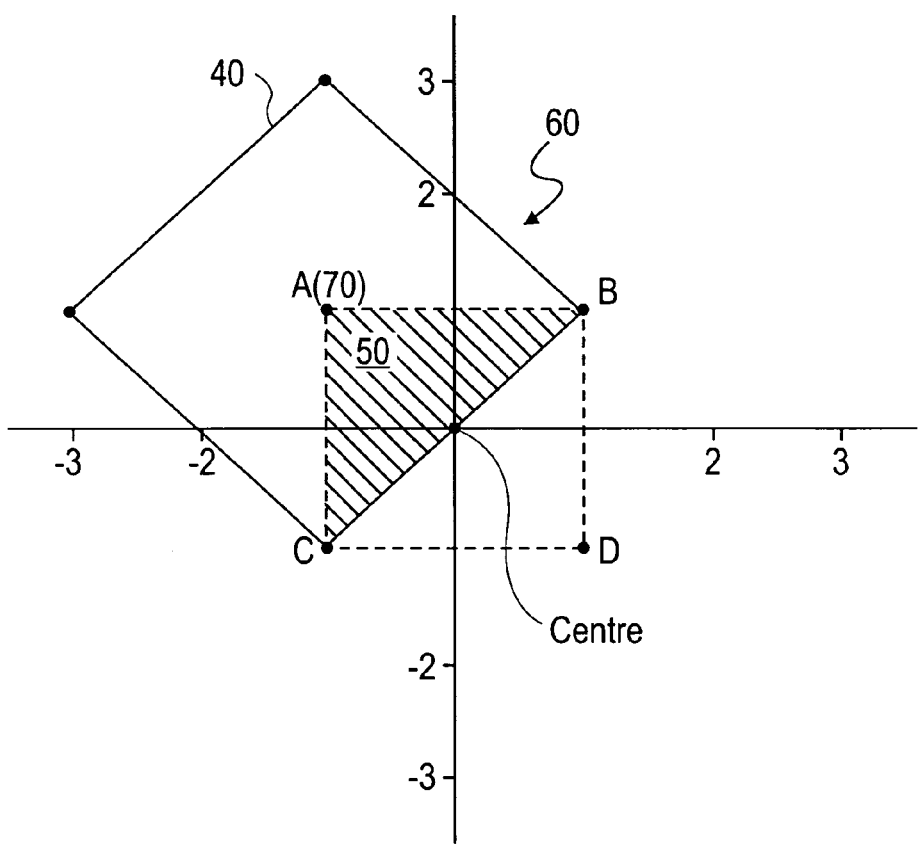
FIG. 3 is a plan view of the weighting function for point A using the coordinate system of FIG. 2.
Figure 4:
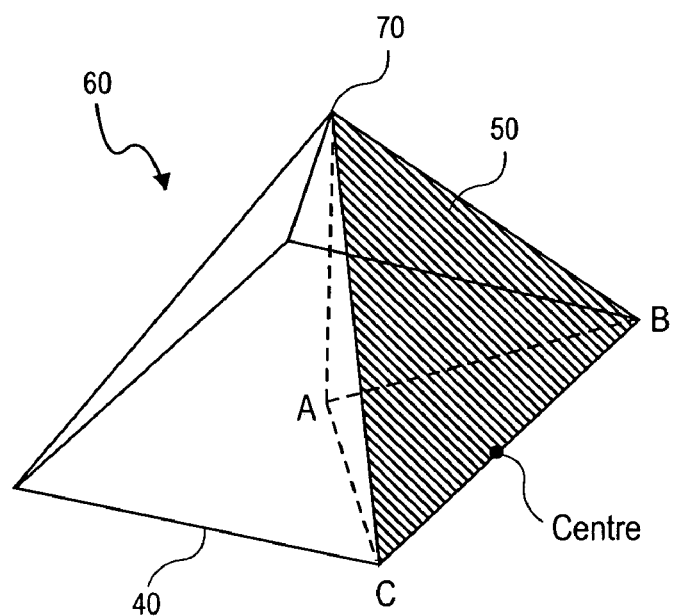
FIG. 4 is a perspective view of the weighting function for point A.

FIG. 3 shows in dashed outline the shape of the square morph pad 20. In addition, FIG. 3 shows a plan view of the pyramid-shaped weighting function for point A. FIG. 4 shows a perspective view of the same pyramid-shaped weighting function.

As FIG. 3 shows, the pyramid 60 has a square base 40 and its apex 70 directly above point A. The square base 40 is skewed at 45° to the displayed square morph pad 20. The height of the pyramid 60 at the apex 70 is 1, representing a weighting factor of 1. The height of the pyramid 60 at the edges of the square base 40 is 0, representing a weighting factor of 0. Preferably, the triangular sides of the pyramid 60 are planar, although they need not be. In the case that they are, the height of the pyramid and hence the weighting factor increases linearly from 0 to 1 as the cursor is moved from the edge of the square base 40 to the apex 70 over point A. If the cursor is positioned outside the boundaries of the square base, the weighting factor is taken as 0.

Given that the distance between the point at the centre and point A is sqrt 2 and the distance between point A and the apex 70 is 1, it is a simple matter to calculate the slope of the triangular face 50 between the apex and the Centre point, and hence the slope of all the other faces, to be at an angle=$\tan^{-1}$ (1/sqrt 2). Consequently, the height above the base and hence the weighting factor at any position on one of the triangular surfaces can be calculated easily.

Figure 5:
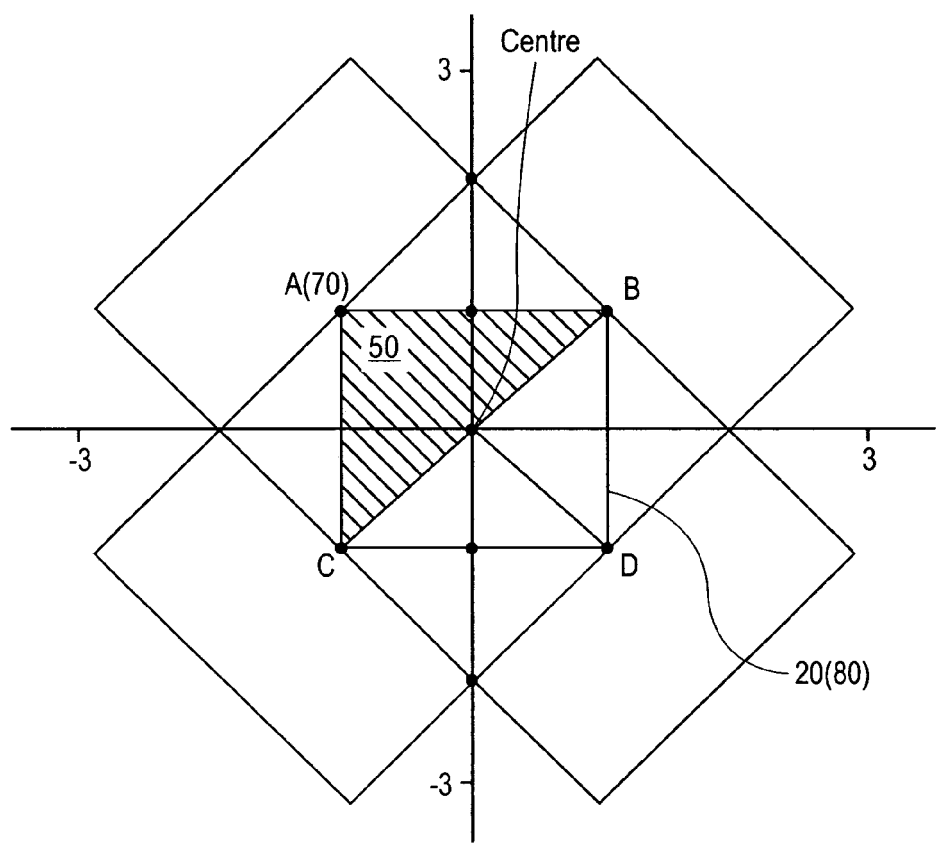
FIG. 5 is a plan view of the weighting function for all five points.

The weighting functions of the other three corner points B–D are preferably similar square-based, right pyramid-shaped weighting functions. Again, the pyramids have their apices directly above the respective points and their square bases skewed at 45° to the displayed square morph pad 20. FIG. 5 shows a plan view of the weighting functions for points A–D. As FIG. 5 shows, the square base 40 of each weighting pyramid for points A–D overlaps with the square base of two other weighting pyramids for points A–D and has one edge in common with the square base of the last weighting pyramid for points A–D. For example, the square base 40 of the weighting pyramid for point A overlaps with the square bases of the weighting pyramids for points B and C and has one edge in common with the square base of the weighting pyramid for point D.

As shown in FIG. 5, the weighting function of the Centre point is also a square-based, right pyramid-shaped weighting function. Its apex is directly above the Centre point. However, the square base 80 is not skewed with respect to the displayed square morph pad 20. Rather, in a preferred embodiment, the square base of the weighting pyramid for the Centre point is the same as the square morph pad 20. Again, the height of the pyramid at the apex is 1, representing a weighting factor of 1, and the height of the pyramid at the edges of the square base 40 is 0, representing a weighting factor of 0. Preferably, the triangular sides of the pyramid are planar, although they need not be. In that case, the height of the pyramid, and hence the weighting factor, increases linearly from 0 to 1 as the cursor is moved from an edge of the square base, which coincides with the edge of the morph pad 20, to the apex over the Centre point. If the cursor is positioned outside the boundaries of the square base, the weighting factor is taken as 0.

Given that the shortest distance between the Centre point and the edges of the square base is 1 and the distance between the Centre point and the apex is also 1, it is a simple matter to calculate the slope of the triangular faces to be at an angle of $\tan^{-1} 1=45°$. Consequently, the height above the base and hence the weighting factor at any position on one of the triangular surfaces can be calculated easily. As FIG. 5 shows, the square base 40 of each weighting pyramid for points A–D overlaps with the square base the weighting pyramid for the Centre point. Thus, all positions on the weighting pyramid for the Centre point are overlapped with two other weighting pyramids.

In summary, using the coordinate system defined in FIG. 2, the five points are defined as lying at coordinates [0,0] (Centre) [−1,1] (A), [1,1] (B), [−1,−1] (C), and and the corners of the square bases of the respective pyramid-shaped weighting functions are defined as lying at:

[−1,1], [1,1], [1,−1], and [−1,−1] (centre);
[−3,1], [−1,3], [1,1], and [−1,−1] (A);
[−1,1], [1,3], [3,1], and [1,−1] (B);
[−3,−1], [−1,1], [1,−1], and [−1,−3] (C); and
[−1,−1], [1,1], [3,−1], and [1,−3] (D).

In a preferred embodiment, only the morph pad 20, defined as the square between four points A–D, is displayed and the cursor may only be positioned within this morph pad. Since the pyramid-shaped weighting functions overlap within the displayed morph pad 20, the sum of the weighting functions is always 1 within the morph pad. In addition, the morph pad fulfils the other rules listed above, namely:

when the cursor is positioned on one of the points A, B, C, D and Centre, the weighting factor for that point is 1 and the weighting factor of the other four points are set at 0;

when a parameter has the same value for two neighbouring points (for example A and B), the morphed value of the parameter remains constant as the cursor is moved along a straight line between the neighbouring points; and when a parameter has the same value for all five points, the morphed value of the parameter remains constant for all positions of the cursor in the square defined by points A–D.

Figure 6:
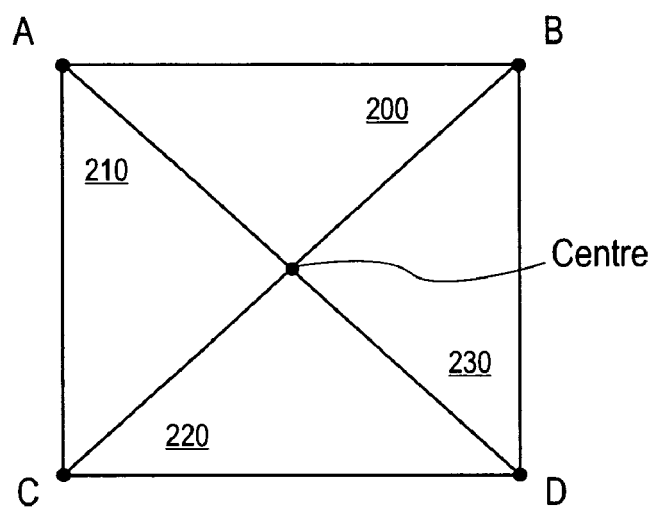
FIG. 6 is another view of the morph pad of FIG. 1.

As is illustrated more clearly in FIG. 6, the morph pad using these pyramid-shaped weighting functions can be considered as being made up of four triangles: triangle 200 between points A–B–Centre; triangle 210 between points A–C–Centre; triangle 220 between points C–D–Centre; and triangle 230 between points D-B–Centre. When the cursor 30 is positioned in one of the triangles, the state set by the cursor 30 is made up of weighted components of the states defined by points making up the triangle.

For example, if the cursor 30 is positioned in triangle 200, the cursor will lie over the area defined by the pyramid-shaped weighting functions for points A, B and Centre. More particularly, the cursor will lie at some point on face 50 of pyramid 60 of the pyramid-shaped weighting function for point A. The weighting factor determined for point A corresponds to the altitude of the cursor at that position on face 50. Similarly, the cursor will lie at some point on one of the faces of the corresponding pyramids for points B and Centre. Again, the weighting factors determined for points B and Centre respectively correspond to the altitude of the cursor at that position on those faces. The sum of the three weighting factors will be 1.

In addition, it should be noted that when the cursor is positioned in triangle 200, the cursor will lie outside the area defined by the pyramid-shaped weighting functions for points C and D. Accordingly, the weighting factor determined for these points will be 0.

An example of the different states defined by the five points and of morphing between those states will now be given. Assume that the present invention is used in a music synthesiser, which synthesises a violin by simulating the vibration of a string.

The sound synthesised for a string will depend on a number of different parameters. For example, the overall timbre of a note can be determined amongst other things by all string material parameters, by the positions of the simulated microphone pickups, the positions of the exciters such as bowing or plucking exciters, the cut-off frequency or resonance of a filter or the parameters of distortion elements inside the signal chain. Each of these parameters may be assigned a different value for each of the five morph points A–D and Centre.

In this example, the state of a sound is defined by the group of parameters comprising: pickup A position, pickup B position, string stiffness, string innerloss, string medialoss, bow position, bow pressure and bow speed. The five points define five respective states having the values:

|  | Centre | A | B | C | D |
| --- | --- | --- | --- | --- | --- |
| pickup A position | 0.1 | 0.5 | 0.3 | 0.6 | 0.2 |
| pickup B position | 0.5 | 0.4 | 0.4 | 0.6 | 0.7 |
| string stiffness | 0.0 | 0.1 | 0.5 | 0.7 | 1.0 |
| string innerloss | 0.1 | 0.2 | 0.2 | 0.3 | 0.1 |
| string medialoss | 0.2 | 0.3 | 0.3 | 0.2 | 0.4 |
| bow position | 0.4 | 0.4 | 0.5 | 0.2 | 0.3 |
| bow pressure | 0.2 | 0.2 | 0.6 | 0.4 | 0.8 |
| bow speed | 0.1 | 0.6 | 0.3 | 0.2 | 0.5 |

(String innerloss is a loss coefficient acting to damp vibration of the string due to the string material and the string stiffness; and string medialoss is a loss coefficient acting to damp vibrations of the string due to properties of the media in which the string is held).

It is noted that although the values of the bow position and bow pressure parameters are the same for the Centre point and point A, other parameter values are different. Thus, points A and Centre define different states. In other words, the value of at least one parameter for each of the five points is different from the value of the same parameter for all the other points. Thus, none of the points has an identical set of values for the group of parameters.

If the cursor is positioned over one of the five points A–D and Centre, then the state set by the cursor has the same parameter values as that point. For example, if the cursor is positioned over the Centre point, then the state set has the parameter values pickup A position=0.1, pickup B position=0.5, string stiffness=0.0, string innerloss=0.1, string medialoss=0.2, bow position=0.4, bow pressure=0.2 and bow speed=0.1. A single note could be played continuously using this set of parameter values. Alternatively, music could then be simulated using this set of parameter values.

Movement of the cursor from the Centre point to point A would then change the value of all these parameters simultaneously from the values at the Centre point listed above to the values determined for point A. Thus, pickup A would move from position 0.1 to 0.5, pickup B would move from position 0.5 to 0.4, the string stiffness would increase from 0.0 to 0, the string innerloss would change from 0.1 to 0.2, the string medialoss would change from 0.2 to 0.3, and the bow would remain on position 0.4 with a pressure of 0.2, but would speed up from 0.1 to 0.6. If other parameters were included in the group, then their values would also change accordingly. Again, a single note could be played continuously using this different set of parameter values. The single note played using this different set of parameter values would sound different to the single note played using the set of parameter values for the Centre point.

If the single note is being played continuously when the cursor is moved from an initial position over the Centre point to a final position over point A, the user will hear the sound output by the synthesiser morph from the state defined by the Centre point to the state defined by point A. The sound experienced by the user during morphing will depend on the path of the cursor 30 over the morph pad 20 from the Centre point to point A and the speed of the cursor along that path.

For smooth morphing, commonly the path will be a direct line between the Centre point and point A and the cursor will move along that straight line at a constant speed. In this way, the weighting factor for the Centre point will drop smoothly from 1 to 0 and the weighting factor for point A will rise smoothly from 0 to 1 at the same rate. The weighting factor for points B–D will remain at 0. Thus, the transition from the set of parameter values for the Centre point to the set of parameter values for point A will be smooth and continuous.

Of course, more complicated sounds than the single note can be played during morphing. Depending on the parameters selected to define the state and the values assigned to those parameters, it is possible to morph between five different synthesised instruments.

The user may be able to use the cursor 30 to set a first initial position in the morph pad 20 (the Centre point in the above example) and a second end position (point A in the above example). The first and second positions can be any positions in the morph pad 20. The synthesiser may then effect smooth morphing between the first and second positions. This is done by determining a straight-line path of the cursor between the first and second positions and calculating how the weighting factors for the five points vary as the cursor moves along the path. The speed of the cursor along the path may be set either automatically or by a user.

Figure 7:
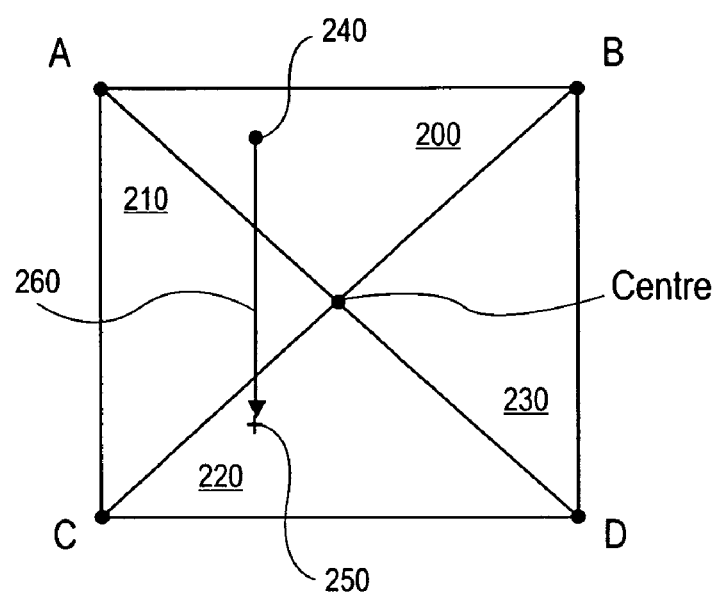
FIG. 7 is a view of the morph pad of FIG. 6 with a cursor path shown on it.

FIG. 7 illustrates such an implementation. Specifically, in FIG. 7 the first position 240 is set in triangle 200 and the second position 250 is set in triangle 220. The straight-line path 260 between the first position 240 and the second position 250 is determined. Then the weighting factors for the five points are determined as the cursor 30 moves along the path.

At the first position 240, each of points A, B and Centre will have a weighting factor between 0 and 1 and points C and D will have a weighting factor of 0. As the cursor moves to the line between points A and Centre, the weighting factor of points A and B will decrease and the weighting factor of the Centre point will increase. This is because the cursor is moving down one face and towards the edge (along the line between B and C) of the pyramid for point A, down one face and towards the edge (along the line between A and D) of the pyramid for point B, and up one face and towards the apex of the pyramid for the Centre point.

When the cursor reaches the line between points A and Centre, the weighting factor of points A and Centre will be between 0 and 1 and the weighting factors of the other three points (including B) will be 0. This is because the cursor has reached the edge of the pyramid for point B (along the line between A and D).

As the cursor crosses triangle 210, the weighting factor of point A will continue to decrease and the weighting factor of the Centre point will remain steady. However, the weighting factor of point C will increase at the same rate the weighting factor of point A decreases. This is because the cursor is moving down one face and towards the edge (along the line between B and C) of the pyramid for point A, parallel to one edge (along the line between A and C) of the pyramid for the Centre point, and up one face away from the edge (along the line between A and D) and towards the apex of the pyramid for point C. The weighting factors of points B and D will remain at 0.

When the cursor reaches the line between points C and Centre, the weighting factor of points C and Centre will be between 0 and 1 and the weighting factors of the other three points (including A) will be 0.

As the cursor crosses triangle 220, the weighting factor of point C will continue to increase and the weighting factor of the Centre point will begin to fall. However, the weighting factor of point D will begin to increase. The weighting factors of points A and B will remain at 0.

As the weighting factors of the five points change, so the sound output by the synthesiser morphs from the state at the first position 240 to the state at the second position 250.

Figure 8:
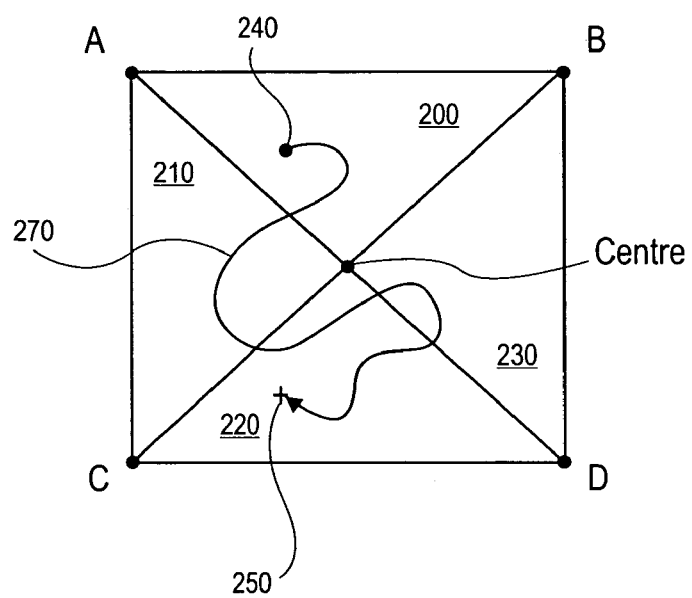
FIG. 8 is another view of the morph pad of FIG. 7 with a different cursor path shown on it.

Instead of, or as well as, setting the first and second positions and automatically determining morphing between those positions, the user may be able to simply drag the cursor over the morph pad to set a morph pattern. This is shown in FIG. 8, in which the path 270 set by the user between the first position 240 and second position 250 is not straight. Again, the weighting factors for the different points will change as the cursor moves along the path. Consequently, the morphing between the state at the first position 240 and the state at the second position 250 is different to the morphing using straight-line path 260 shown in FIG. 7.

When a tune comprising multiple notes is played, the path 260, 270 can either be used once for the tune as a whole. Alternatively, the path can be used polyphonically. If the path is used polyphonically, the parameters are morphed for each note individually, with the path starting at the beginning of each note. Thus, each note starts with a first state and is individually morphed to a second state. In various embodiments, an apparatus of the present invention may be able to carry out either or both of these functions.

In addition, once a morph path has been generated or recorded, the user may be enabled to modify one or more morph paths. For example, the user may be able to loop the whole path or sections of the path and he may be able to cause the cursor to follow the path or sections of the path backwards and forwards continuously or as many times as desired.

After the path 270 has been set, the speed of the cursor 30 along the path 270 may be set automatically or by the user. Alternatively, the speed may be set to correspond with the speed with which the user dragged the cursor 30 over the morph pad 20 to "draw" the path 270.

It is noted that in the prior art square morph pad with four fixed points, shown in FIG. 9, it is possible to transition directly between any pair of adjacent points without introducing an influence from any other point—in other words, with the weighting factors remaining zero for other two points. Thus, it is possible to transition directly between A–B, A–C, B–D and C–D, but not between A–D and B–C.

The present invention encompasses providing pentagon- and other-shaped morph pads. However, an advantage of providing the fifth point in the centre of the square is that the same transitions between all these pairs of points can still be achieved. In addition, transitions between each pairing of Centre-A, Centre-B, Centre-C and Centre-D can also be performed. This makes a total of eight possible pairs.

Accordingly, the only pairs of points that cannot be transitioned between directly remain A–D and B–C.

In contrast, if a fifth point E is added in the prior art morph pad to create a pentagon shaped display with all the fixed points lying at respective corners of the pentagon, then the number of pairs of points that can be transitioned between directly will be reduced. More specifically, it will be possible to transition directly between only points A–B, B–C, C–D, D–E and E–A. This makes a total of only five possible pairs.

In addition, the present invention encompasses providing a pentagon-shaped morph pad with fixed points lying at respective corners of the pentagon and a sixth fixed point lying at the centre of the pentagon. In that case, the weighting pyramids for all the fixed points will have pentagon shaped bases. The base of the Centre point will preferably be the same as the morph pad itself. The bases of the corner points will be rotated relative to the morph pad so that each has an edge on which the Centre point lies.

Similarly, the present invention encompasses providing a triangle-shaped morph pad with fixed points lying at respective corners of the triangle and a fourth fixed point lying at the centre of the pentagon. In that case, the weighting pyramids for all the fixed points will have triangle shaped bases. The base of the Centre point will preferably be the same as the morph pad itself. The bases of the corner points will be rotated relative to the morph pad so that each has an edge on which the Centre point lies. In this case, it will be possible to transition between all possible pairs of points.

Hexagonal morph pads and morph pads having additional numbers of corners are also contemplated. However, the larger the number of corners and hence fixed points, the lower the ratio of the number of pairs of points that can be transitioned between directly and the possible number of pairs of points. Preferably, in each case an additional fixed point is included within, rather than on, the boundary of the morph pad. More preferably still, the additional fixed point is provided at the centre of the morph pad.

Figure 10:
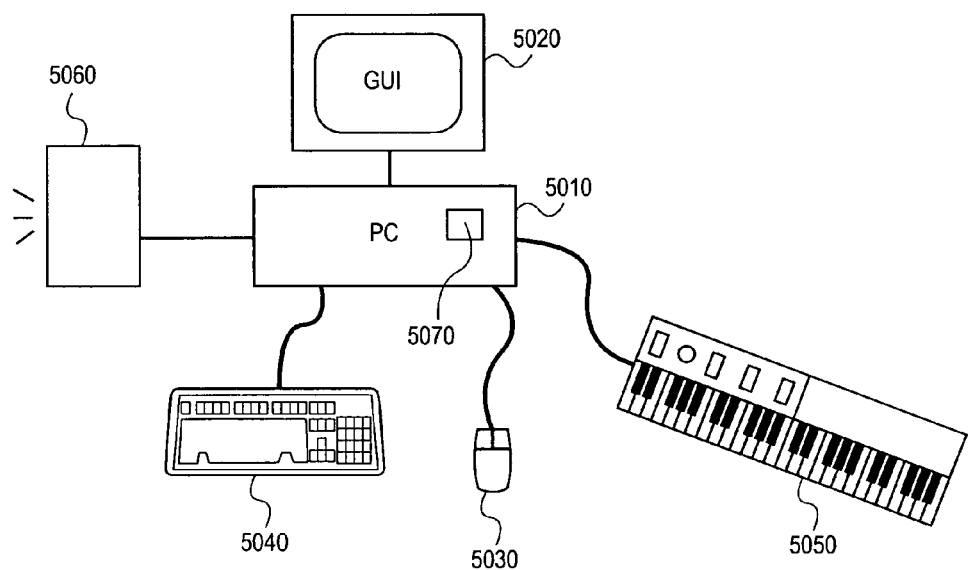
FIG. 10 shows one embodiment of an apparatus according to the present invention, in which a personal computer is programmed to run a synthesiser application program.

As noted above, the present invention may be implemented in a synthesiser application program run by a personal computer (PC) 5010 with a processor 5070, as shown in FIG. 10. In addition to the PC 5010 and its processor 5070, such an implementation may use a monitor 5020 which may display a GUI, a mouse 5030 (which is a form of a cursor positioning device), a keyboard 5040, a speaker 5060 and optionally a further, piano-style keyboard 5050. In that case, the monitor 5020 of the PC 5010 is preferably used to display the morph pad 20 and the cursor 30. The mouse 5030 is preferably used to move the cursor 30 over the morph pad 20, for example by the well-known click and drag method. The PC keyboard 5040 and/or mouse 5030 may used to set what one or more parameters will be included in the group of parameters used to define the morphed state and to set each of the parameter values associated with each of the five points. Either each parameter value may be entered individually or previously created groups of parameter values may be used. The previously created groups of parameter values may have been created by the user or may have been created by the programmer and stored together with or separately from the synthesiser application program.

In addition, the user may also be able to trigger a randomisation process by which the values of the groups of parameter can be generated. In this case, the user could select all or some of the parameters and choose an arbitrary randomisation intensity from, for example 1% or lower (slight variations) to 100% (totally random values). By clicking on a randomisation trigger button, the values of the selected parameters for one, some or all of the five points A–D and Centre as desired will be randomised. Combined with the possibility of copying groups of parameter values between the five points A–D and Centre and from a current position of the cursor, a user may also be able to "breed" sounds by selection and "mutation".

The synthesiser application program and the groups of parameter values may be stored on the PC hard drive, on a recording medium such as a CD-ROM or may be downloaded, for example, from the Internet. The PC processor is preferably used to calculate the weighting coefficients of the five points as the cursor 30 is moved over the morph pad 20.

However, the present invention is not limited to this implementation. For example, the parameters in the group and/or the parameter values for each of the points may be prestored and immutable.

In addition and irrespective of how the parameters in the group and/or the value of each of the parameters are selected for each of the points, the morph pad need not be displayed using a PC monitor. Instead, the morph pad 20 may be provided using electronic paper (which for the purposes of the present application includes touch-sensitive LCD displays, touch-sensitive pads and like devices) and the cursor may be moved in the morph pad 30 using for example a finger, a stylus or an electronic pen. In a further alternative, the morph pad may be provided as hardware with a joystick provided therein, movement of the joystick being used to determine the morph path 260, 270.

Moreover, the present invention is not limited to morphing of sound. Rather, the present invention can be applied to any form of morphing, including morphing between images. In this case, the parameters used to define a state may include colour, brightness, position and so forth.

An apparatus of the present invention is not limited to an appropriately programmed PC and peripheral devices. It also includes any specifically designed, stand alone or intermediate morphing apparatuses.

In addition, although the arrangement of pyramid-shaped weighting functions discussed above is preferred, the present invention is not restricted to this arrangement. In particular, the pyramids need not be square-based or be right pyramids. Similarly, their triangular faces need not be planar, so that the weighting factor does not increase linearly with linear movement in the [x, y] direction. Indeed, the weighting functions need not pyramid-shaped; the sum of the weighting factors at any one point in the morph pad need not extend to 1; and the pad need not be confined to the square between points A–D. Instead, it could extend beyond this square and encompass for example the whole area taken up by the weighting functions. In addition, it is to be understood that the expression "pyramid-shaped" is taken to mean any part of a pyramid that falls within the morph pad (however that is defined) and, for example, in FIGS. 3 to 5 extends to the plane 50 between points B and C and the apex over point A. In addition, the region defined by points A–D need not be square or even rectilinear.

The foregoing description has been given by way of example only and it will be appreciated by a person skilled in the art that modifications can be made without departing from the scope of the present invention.

The invention claimed is:

1. A method of setting a state, which is defined by a group of one or more parameters, the method comprising:
   providing a display of at least five fixed points each associated with the group of one or more parameters, wherein the values of each of the one or more parameters in the group are predetermined for each fixed point and wherein the value of at least one parameter for each fixed point is different from the value of the same parameter for all the other fixed points; and positioning an unfixed point in the display to set the state, whereby the value of each of the one or more parameters of the group defining the state is determined using the value of the corresponding parameter of each of the fixed points combined with a respective weighting factor, the respective weighting factor for each fixed point depending on the position of the unfixed point relative to that fixed point.

2. A method according to claim 1, wherein the value of each of the one or more parameters of the group defining the state is determined by adding together the results of the respective values of the corresponding parameter of the fixed points each multiplied by the respective weighting factor.

3. A method according to claim 1, wherein the respective weighting factors for the fixed points are determined in accordance with respective weighting functions, whereby:
when the unfixed point is positioned on one of the fixed points, the weighting factor for that fixed point is 1 and the weighting factor of the other fixed points is 0;
when a parameter has the same value for two neighbouring fixed points, the value of the parameter defining the state remains constant as the unfixed point is moved along a straight line between the neighbouring fixed points; and
when a parameter has the same value for all the fixed points, the value of the parameter remains constant for all positions of the unfixed point.

4. A method according to claim 1, wherein, when the unfixed point is positioned on any one of the fixed points, the weighting factor of that fixed point is Set at 1 and the weighting factors of the other fixed points are set at 0, whereby the values of the one or more parameters of the group defining the state are set the same as the predetermined values of the one or more parameters of the group for that fixed point.

5. A method according to claim 4, wherein, when the unfixed point is positioned on a straight line between the closest two fixed points, the sum of the weighting factors of those two fixed points is 1 and the weighting factors of the other fixed points are set at 0.

6. A method according to claim 5, wherein, when the unfixed point is positioned on a straight line between the closest two fixed points, the ratio of the weighting factor of a first of the closest fixed points to the weighting factor of a second of the closest fixed points is the same as the ratio of the distance of the unfixed point from the first fixed point to the distance of the unfixed point from the second fixed point.

7. A method according to claim 3, wherein, when the unfixed point is positioned neither on any one of five fixed points nor on a straight line between the closest two fixed points, the sum of the weighting factors of the closest three fixed points is 1 and the weighting factors of the other two fixed points are set at 0.

8. A method according to claim 1, wherein all the points are displayed in two dimensions.

9. A method according to claim 8, further comprising displaying four of the fixed points at the respective four corners of a square and a Fifth fixed point at the centre of the thus displayed square.

10. A method according to claim 9, further comprising positioning the unfixed point only within the displayed square.

11. A method according to claim 9, wherein the weighting factor for each of the fixed points is determined using a respective pyramid-shaped weighting function.

12. A method according to claim 11, wherein each pyramid-shaped weighting function has a square base and an apex at the respective fixed point.

13. A method according to claim 12, wherein:
the weighing factor for an fixed point is set at 1 when the unfixed point is positioned on the apex;
the weighting factor is set at 0 when the unfixed point is positioned on one of, or outside, the edges of the square base; and
the weighting factor is set between 0 and 1 when the unfixed point is positioned between the apex and one of the edges of the square base depending on the height of the unfixed point up the pyramid.

14. A method according to claim 12, wherein the square bases of the pyramid-shaped weighting functions of the four corner fixed points are at 45° to the displayed square.

15. A method according to claim 12, wherein the square base of the pyramid-shaped weighting function of the fixed point at the centre of the displayed square is concentric with the displayed square.

16. A method according to claim 15, wherein the square base of the pyramid-shaped weighting function of the fixed point at the centre of the displayed square is the same as the displayed square.

17. A method according to claim 12, wherein the square bases of the pyramid-shaped weighting functions of the four corner fixed points have the same area as one another.

18. A method according to claim 12, wherein, if the five fixed points are defined as lying at coordinates [0,0], [−1,1], [1,1], [−1,1], and [1,−1] respectively, then the corners of the square bases of the respective pyramid-shaped weighting functions are defined as lying at:
[−1,1], [1,1], [1,−1], and [−1,−1];
[−3,1], [−1,3], [1,1], and [−1,−1];
[−1,1], [1,3], [3,1], and [1,−1];
[−3,−1], [−1,1], [1,−1], and [−1,−3and
[−1,−1], [1,1], [3,−1], and [1,−3]respectively.

19. A method according to claim 1, further comprising setting movement of the position of the unfixed point in the display, thereby effecting a corresponding transition of the state.

20. A method according to claim 1, further comprising setting the predetermined values of the one or more parameters in the group for each of the fixed points.

21. A method according to claim 1, wherein the state is an image state, including video.

22. A method according to claim 1, wherein the state is an audio state.

23. A method according to claim 22, further comprising synthesising a sound, the state of the sound being defined by the group of parameters.

24. A method according to claim 23, wherein the sound is synthesised by simulating a vibrating string and the group of parameters comprises one or more of string stiffness, pickup position, string loss, bow pressure, bow speed and bow position.

25. A method as in claim 23 wherein the position of the unfixed point is controlled by a cursor positioning device.

26. An apparatus for setting a state, which is defined by a group of one or more parameters, the apparatus comprising:
a display for displaying at least five fixed points each associated with the group of one or more parameters, wherein the values of each of the one or more parameters in the group are predetermined for each fixed point and wherein the value of at least one parameter for each fixed paint is different from the value of the same parameter for all the other fixed points; and a control coupled to the display, the control for positioning a unfixed point in the display to set the state; and a processor coupled to the control, the processor for determining the value of each of the one or more parameters of the group defining the stare using the value of the corresponding parameter of each of the fixed points combined with a respective weighting factor, the respective weighting factor for each fixed point depending on the position of the unfixed point relative to that fixed point.

27. An apparatus according to claim 26, wherein the value of each of the one or more parameters of the group defining the stare is determined by adding together the results of the respective values of the corresponding parameter of the fixed points each multiplied by the respective weighting factor.

28. An apparatus according to claim 26, wherein the processor is adapted to determine the respective weighting factors for the fixed points in accordance with respective weighting functions, whereby:
when the unfixed point is positioned on one of the fixed points, the weighting factor for that fixed point is 1 and the weighting factor of the other fixed points is 0;
when a parameter has the same value for two neighbouring fixed points, the value of the parameter defining the state remains constant as the unfixed point is moved along a straight line between the neighbouring fixed points; and
when a parameter has the same value for all the fixed points, the value of the parameter remains constant for all positions of the unfixed point.

29. An apparatus according to claim 26, wherein, when the unfixed point is positioned on any one of the fixed points, the weighting factor of that fixed point is set at 1 and the weighting factors of the other fixed points are set at 0, whereby the values of the one or more parameters of the group defining the state are set the same as the predetermined values of the one or more parameters of the group associated with that fixed point.

30. An apparatus according to claim 29, wherein, when the unfixed point is positioned on a straight line between the closest two fixed points, the sum of the weighting factors of those two fixed points is 1 and the weighting factors of the other three fixed points are set at 0.

31. An apparatus according to claim 30, wherein, when the unfixed point is positioned on a straight line between the closest two fixed points, the ratio of the weighting factor of a first of the closest Fixed points to the weighting factor of a second of the closest fixed points is the same as the ratio of the distance of the unfixed point from the first fixed point to the distance of the unfixed point from the second fixed point.

32. An apparatus according to claim 26, wherein, when the unfixed point is positioned neither on any one of five fixed points nor on a straight line between the closest two fixed points, the sum of the weighting factors of the closest three fixed points is 1 and the weighting factors of the other two fixed points are set at 0.

33. An apparatus according to claim 26, wherein all the points are displayed in two dimensions.

34. An apparatus according to claim 33, in which four of the fixed points are displayed at the respective four corners of a square and a fifth fixed point at the centre of the displayed square.

35. An apparatus according to claim 34, further comprising positioning the unfixed point only within the displayed square.

36. An apparatus according to claim 34, wherein the weighting factor for each of the fixed points is determined using a respective pyramid-shaped weighting function.

37. An apparatus according to claim 36, wherein each pyramid-shaped weighting function has a square base and an apex at the respective fixed point.

38. An apparatus according to claim 37, wherein:
the weighing factor for an fixed point is set at 1 when the unfixed point is positioned on the apex;
the weighting factor is set at 0 when the unfixed point is positioned on one of or outside the edges of the square base; and
the weighting factor is set between 0 and 1 when the unfixed point is positioned between the apex and one of the edges of the square base depending on the height of the unfixed point up the pyramid.

39. An apparatus according to claim 37, wherein the square bases of the pyramid-shaped weighting functions of the four corner Fixed points are at 45° to the displayed square.

40. An apparatus according to claim 37, wherein the square base of the pyramid-shaped weighting function of the fixed point at the centre of the displayed square is concentric with the displayed square.

41. An apparatus according to claim 40, wherein the square base of the pyramid-shaped weighting function of the fixed point at the centre of the displayed square is the same as the displayed square.

42. An apparatus according to claim 37, wherein the square bases of the pyramid-shaped weighting functions of the four corner fixed points have the same area as one another.

43. An apparatus according to claim 37, wherein, if the five fixed points are defined as lying at coordinates [0,0], [−1,1], 1,1], [−1,−1]and [1,−1] respectively, then the corners of the square bases of the respective pyramid-shaped weighting functions are defined as lying at:
[−1,1], [1,1], [1,−1], and [−1,−1];
[−3,1], [−1,3], [1,1], and [−1,−1];
[−1,1], [1,3], [3,1], and [1,−1];
[−3,−1], [−1,1], [1,−1], and [−1,−3]; and
[−1,−1], [1,1], [3,−1], and [1,−3] respectively.

44. An apparatus according to claim 26, wherein said control is capable of setting movement of the position of the unfixed point in the display, thereby effecting a corresponding transition of the state.

45. An apparatus according to claim 26, wherein the state is an image state, including a video state.

46. An apparatus according to claim 26, wherein the state is an audio state and the apparatus is a synthesiser for synthesising a sound, and the state of the sound is defined by the group of parameters.

47. A synthesis set according to claim 46, in which the sound is synthesised by simulating a vibrating string, wherein the parameters comprise one or more of string stiffness, pickup position, string loss, bow pressure, bow speed and bow position.

48. A method of setting a state, which is defined by a group of one or more parameters, the method comprising:
providing a display of fixed points each associated with the group of one or more parameters, wherein the values of each of the one or more parameters in the group are predetermined for each fixed point, wherein all but one of the fixed points are located corners of a boundary and the remaining fixed point is located within the boundary; and positioning an unfixed point in the display to set the state, whereby the value of each of the one or more parameters of the group defining the state is determined using the value of the corresponding parameter of each of the fixed points combined with a respective weighting factor, the respective weighting factor for each fixed point depending on the position of the unfixed point relative to that fixed point.

49. An apparatus for setting a state, which is defined by a group of one or more parameters, the apparatus comprising:

a display for displaying fixed points each associated with the group of one or more parameters, wherein the values of each OF the one or more parameters in the group are predetermined for each fixed point, wherein all but one of the fixed points are located at corners of a boundary and the remaining fixed point is located within the boundary; and a control coupled to the display, the control for positioning a unfixed point in the display to set the state; and a processor coupled to the control, the processor for determining the value of each of the one or more parameters of the group defining the state using the value of the corresponding parameter of each of the fixed points combined with a respective weighting factor, the respective weighting factor for each fixed point depending on the position of the unfixed point relative to that fixed point.

50. A machine readable medium which provides a computer program for causing a computer to perform a method according to claim 48.

51. A machine implemented method of determining a behavior of a presentation, the method comprising:

displaying at least five fixed points on a display, the five fixed points representative of five different possible states of a presentation, each of the five states associated with a group of one or more parameters, wherein all but one of the fixed points define a boundary and the remaining fixed point is within the boundary;

controlling a position of unfixed point moveable within the boundary to define the behavior of the presentation.

52. A method as in claim 51 wherein said presentation is at least one of audio and video presentations.

53. A machine readable medium providing an executable computer program which causes a data processing system to perform a method of determining a behavior a presentation, the method comprising:

displaying at least five fixed points on a display, the five fixed points representative of five different possible states of a presentation, each of the five states associated with a group of one or more parameters, wherein all but one of the fixed points define a boundary and the remaining fixed point is within the boundary;

controlling a position of an unfixed point moveable within the boundary to define the behavior of the presentation.

54. A machine readable medium as in claim 53 wherein said presentation is at least one of audio and video presentations.

55. An apparatus for determining a behavior of a presentation, the apparatus comprising;

means for displaying at least five fixed points on a display, the five fixed points representative of five different possible states of a presentation, each of the five states associated with a group of one or more parameters, wherein all but one of the fixed points define a boundary and the remaining fixed point is within the boundary;

means for controlling a position of an unfixed point moveable within the boundary to define the behavior of the presentation.

* * * * *